(No Model.) 2 Sheets—Sheet 1.
J. F. STEWARD.
SIDE DELIVERY HAY RAKE.
No. 562,432. Patented June 23, 1896.
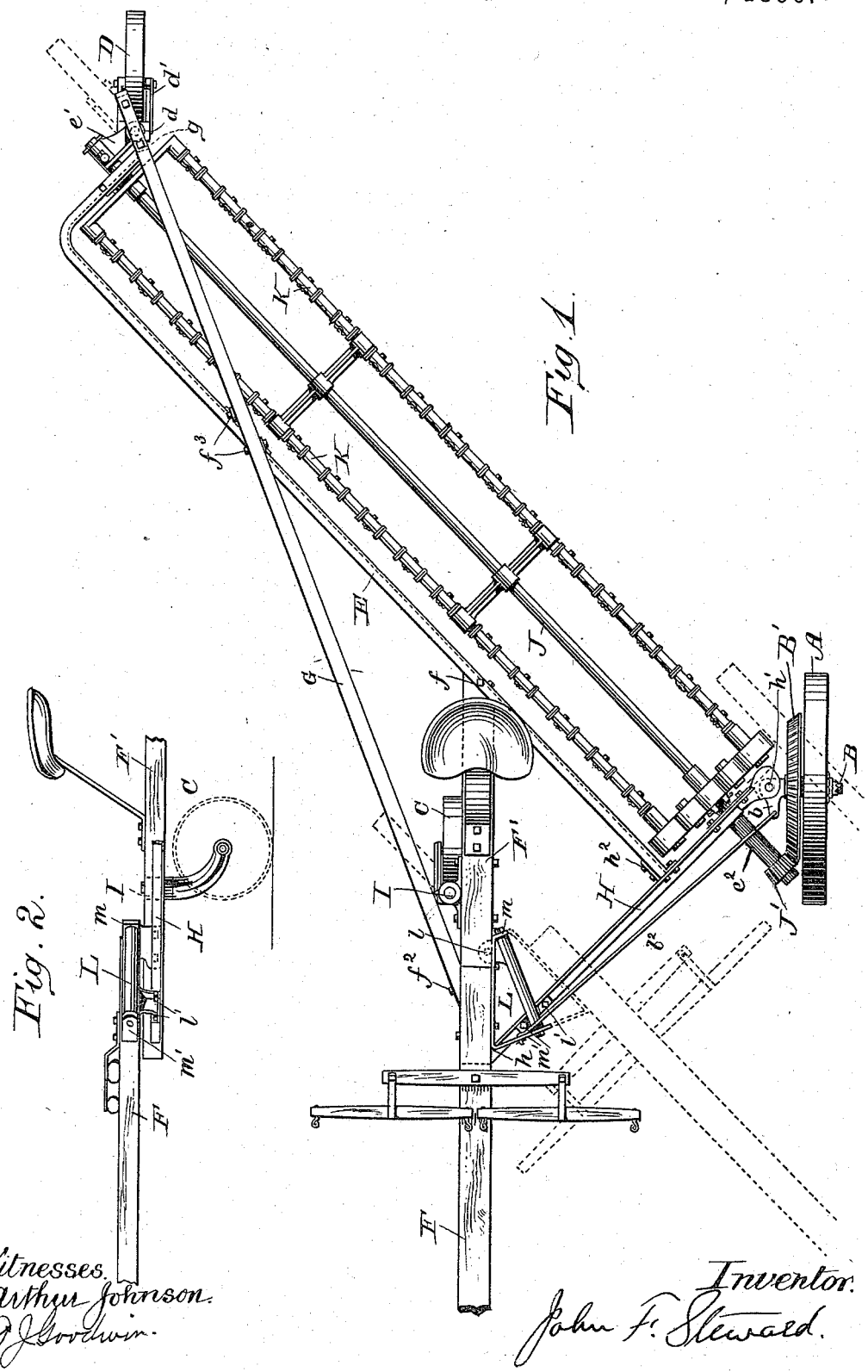
Witnesses
Arthur Johnson
D. J. Goodwin
Inventor
John F. Steward

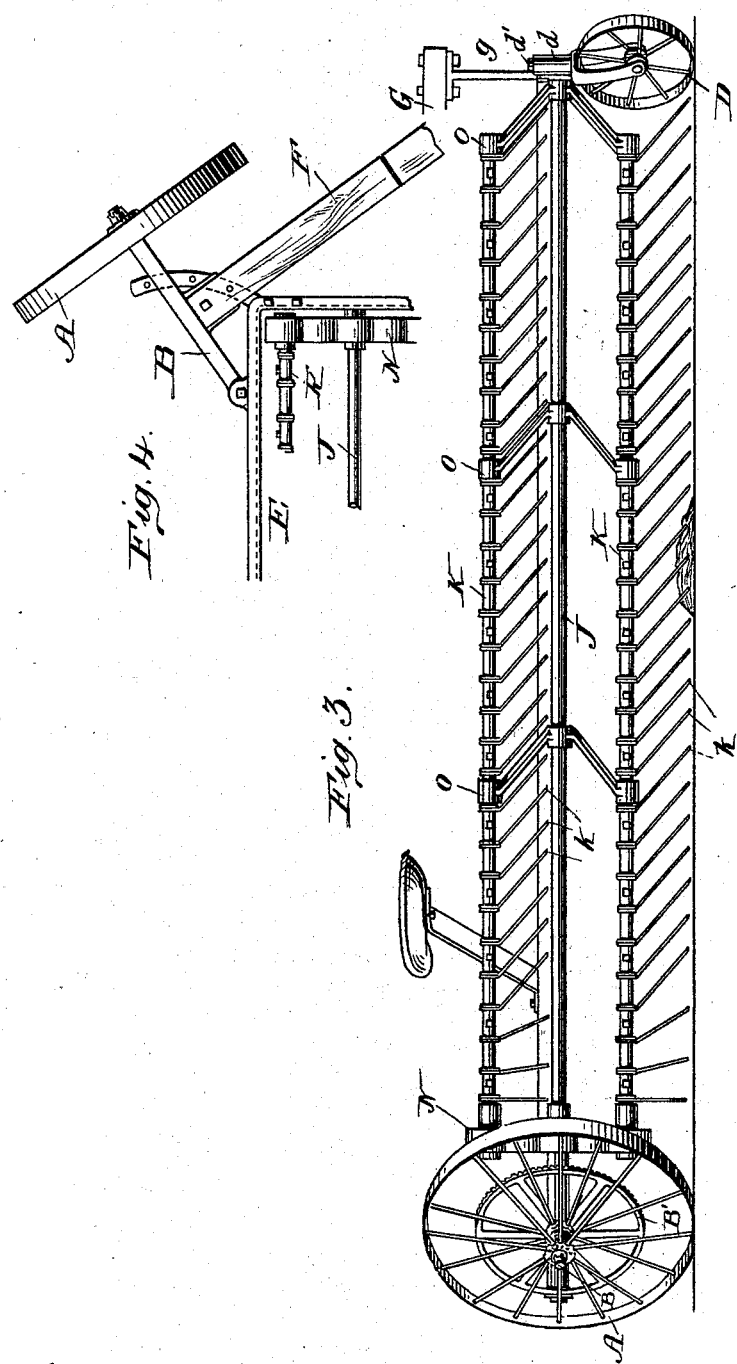

UNITED STATES PATENT OFFICE.

JOHN F. STEWARD, OF CHICAGO, ILLINOIS.

SIDE-DELIVERY HAY-RAKE.

SPECIFICATION forming part of Letters Patent No. 562,432, dated June 23, 1896.

Application filed June 20, 1895. Serial No. 553,496. (No model.)

*To all whom it may concern:*

Be it known that I, JOHN F. STEWARD, of Chicago, in the county of Cook and State of Illinois, have invented certain new and useful Improvements in Side-Delivery Hay-Rakes, of which the following is a full description, reference being made to the accompanying drawings, in which—

Figure 1 is a plan view of a side-delivery rake that may be considered of a general kind now in use, to which my improvements are thereon to be attached. Fig. 2 is a detail side view. Fig. 3 is a rear elevation designed to show my improvement in the rake-teeth. Fig. 4 shows a modification of the means for connecting the tongue to the rake-frame.

Certain of the improvements that are shown will be claimed in another application.

The object of the invention is to so construct rake-teeth that when the rake is drawn over uneven ground the ends of the teeth will conform to the latter, and also to so construct a machine as to adapt it to be easily transported.

In the drawings, A is the main supporting-wheel secured, preferably, to a short axle B.

C and D are caster-wheels. Upon these wheels the main frame is supported.

E is a strong bar, its longer part substantially parallel with the rake-heads, and connected to the bearing $e'$. In this bearing is a socket $d$, in which the stem $d'$ of the caster-wheel D rests.

F is the tongue.

F' is a beam extending forward from the bar E, to which it is secured by the bolt $f$.

G is a brace extending from a stud $g$ over the rakes and the bar E to the bar F, where it is joined by the bolt $f^2$.

$f^3$ are suspending-links by which the bar E is supported from the bar G. H is a bar to which the axle-bar is pivoted at $h'$. It also receives the bearing $e^2$. This bar H is secured at $h$ to the bar F', and also to the bar E at $h^2$.

I is a socket secured to the bar F' and adapted to receive the stem of the caster-wheel C. These parts last mentioned constitute the main supporting-frame.

To the wheel B is secured the bevel-gear B', and to the shaft J of the rakes is secured the pinion J' by clutching mechanism or otherwise.

Referring first to the means for transportation, generally considered, the invention consists in adapting all wheels to be so turned and the tongue to be placed in such a position that the team hitched thereto may draw the machine endwise. The necessity for this is apparent when the extreme length of the rake is considered in connection with the narrowness of gates and of country roads.

In Fig. 4 I have shown, as a modification, simple means for turning the wheel and the tongue by attaching the tongue directly to the axle B. This may be advisable when a form of frame of different shape from that shown is used. I have shown the rakes K as placed at an angle of forty-five degrees relative to the line of the advancement of the machine. This angle may be varied, however.

In order to draw the rake lengthwise, it is necessary that the wheel A and its axle B should turn forty-five degrees, more or less. The caster-wheels, of course, take care of themselves.

As the machine rests upon three wheels it is necessary that the tongue should be free to a slight vertical movement at its forward end.

In order to easily change the tongue from its position shown in the full lines in Fig. 1 to that shown in the dotted lines, I provide a hinge that will also permit the tongue to have the slight up-and-down movement referred to at its forward end. To the bar F' and H, I secure a sleeve L, bolting at $l$ to the bar F' and at $l'$ to the bar H. This may be two hinges instead one long one secured upon the frame; but I prefer the sleeve and place its axis high, as shown in Fig. 2. From the tongue I extend two arms $m$ and $m'$, preferably as one piece. It will be clear that although this axis is not at right angles to the length of the tongue, still, because it is not parallel therewith, the tongue can rise and fall on it somewhat. The end of the tongue will, when it moves, move in the arc of a large circle; but, as its movement is not great while the team is working the machine, the fact that the end departs slightly sidewise from an exact line, relative to the framework to which it is secured, will cut no material figure. The object in placing the axis of the movement of the tongue in a diagonal position is so as to enable me to easily change the position of the tongue from that in which it is when the machine is drawn forward in working to that in which it is when traveling over the road. It will be readily seen that it is only necessary to swing the tongue over from the position shown in the full lines to that shown in the dotted lines of Fig. 1 to place it rightly for drawing the machine lengthwise. The pivot at $h$ is provided so that the main supporting-wheel may be shifted from its position shown in the full lines in Fig. 1 to that shown in the dotted lines in the same figure. This shifting of the wheel may be accomplished in many ways, and it may be as well secured in its new position in many ways; but I have thought it advisable to provide the axle with an arm $b$, projecting substantially at right angles to the axis of the axle, and provide the arm $h'$ with an eye, in which and in an eye in the arm $b$ I hook the connecting-rod $b^2$. The eye $b'$ is so placed in the arm $h'$ that when the parts are in working position it and the axis of the hinge-pin $b^2$ are substantially in line with the eye in the arm $b$ of the axis B. The result of this is that the slight movement of the tongue in the neck-yoke of the draft-team in a vertical direction will not materially change the mesh of the gears B' and $j'$, but that when the tongue is swung over to the position shown in the dotted lines in Fig. 1 the gears will be thrown out of mesh. When the tongue is transposed to the new position, the doubletrees are thrown beneath the tongue; but this is not serious, as doubletrees are often so used. If the operator desires, however, he can replace them above.

In working with side-delivery rakes of the general kind shown, I have found that if the rake-teeth are vertical they will not conform to undulations of the surface of the ground, the result being that if a slight knoll is passed over the forward movement of the rake-bars is prevented, and if a hollow in the surface of the ground be passed over the ends of the teeth will not take the hay therefrom.

Turning now to Fig. 3, the shaft J is shown as provided with cross-arms N and O O O. In these arms are supported the shafts K and K, preferably made of gas-pipe, and to that in turn the rake-teeth $k$ are secured. The "rake-heads," as they may be termed, K, are so connected that the plane of the teeth shall always be substantially vertical, and they are controlled by a system of gearing in the cross-support N, so that the rake heads and teeth remain in the plane shown in Figs. 1 and 3. The teeth are formed of stiff wire, coiled around bars K, and then extending downwardly and toward the delivery end of the rake, which in Fig. 3 is to the right. As the machine is moved forward over the ground the rake-heads move in an orbit and the teeth thereof spring up or down as the surface of the said ground compels or permits. The placement of the teeth at the angle shown, I have found by the operation of the machine in the field to be as effective as if they were vertical.

At the left of Fig. 3 I have shown a few of the fingers at right angles to the rake-heads. This is only for the purpose of making the effective length of the rake as great as possible. The fact is that as the teeth at the immediate left are so near to the supporting-wheel that they may rise and fall the latter when it passes into a depression in the ground or rises over a knoll, they may be straight. It is, however, preferable to have them all inclined.

In the drawings I have shown but a single motor-wheel B having the bevel-gear B' meshing into the pinion J' of the shaft J; but it is obvious that a similarly large wheel can be placed in substantially the position now occupied by C and geared to the moving parts of the rake, in which event it must also turn to permit the rake to be drawn over the road.

What I claim as my invention, and desire to secure by Letters Patent, is—

1. In a hay-rake and in combination with the frame thereof, a draft-tongue and a hinge-joint on which said draft-tongue is pivoted to said frame, the said joint having an axis that is substantially horizontal and that is placed at an angle midway between the line of travel of the machine and the line of its greater length, whereby the said tongue can be swung from the position it occupies in working to one substantially in line with the greater length of the machine, substantially as described.

2. In a hay-rake and in combination, the supporting-frame, diagonally-acting raking devices mounted thereon, caster-wheels supporting said frame, a draft-tongue, a hinge-joint on which said draft-tongue is pivoted to said frame, the said joint having an axis that is substantially horizontal and that is placed at an angle midway between the pivoted line of travel on the machine and the line of its greater length whereby the said tongue can be swung from the position it occupies in working to one substantially in line with the greater length of the machine, a main driving-wheel the axis of which is pivoted to the said frame, and means connected to said tongue and to said pivoted axis whereby, when the tongue is swung from the one position to the other, the said wheel is also swung from its working position to a position substantially in line with the greater length of the machine, substantially as described.

3. In a hay-rake, the combination of the main frame and supporting-wheels, the latter connected to the former and adapted to have their axes turned from the position they occupy when the machine is working to one that shall permit the rake to be drawn in the direction of its greater length; a draft-tongue pivoted upon an axis that divides the angle formed by the line of the length of the tongue when in the position it occupies while the machine is working, and that of the position it occupies when the machine is being drawn in the direction of its greater length, whereby by the turning of the tongue, it may be made to assume one or the other directions referred to, substantially as described.

4. In a side-delivery hay-rake, a series of orbitally-moving rake-heads adapted to sweep over the ground in a direction diagonal to the advance of the machine, whereby the hay is given a forward sideward direction, said teeth declined from the said bars so as to reach toward the ground in a deliveryward direction from their supporting-bar, whereby increased flexibility is given them and they are permitted to better draw over obstructions, substantially as described.

5. In a side-delivery hay-rake, the combination of the orbitally-moving rake-heads K K adapted to operate upon the hay by a sweeping movement, and having the deliveryward declining teeth $k$, substantially as described.

JOHN F. STEWARD.

Witnesses:
ARTHUR JOHNSON,
GEO. G. MOODY.